(12) United States Patent
Chudasama et al.

(10) Patent No.: US 10,875,795 B2
(45) Date of Patent: Dec. 29, 2020

(54) PROCESS FOR REMOVAL OF ANION FROM AQUEOUS SOLUTION

(71) Applicant: RELIANCE INDUSTRIES LIMITED, Maharashtra (IN)

(72) Inventors: Chintansinh Dharmendrasinh Chudasama, Gujarat (IN); Sumeet Kumar Sharma, Dombivili (IN); Kalpana Gopalakrishnan, Gujarat (IN); Nagesh Sharma, Gujarat (IN); Raksh Vir Jasra, Gujarat (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 482 days.

(21) Appl. No.: 15/401,954

(22) Filed: Jan. 9, 2017

(65) Prior Publication Data

US 2017/0197853 A1 Jul. 13, 2017

(30) Foreign Application Priority Data

Nov. 1, 2016 (IN) .............................. 201621001019

(51) Int. Cl.
| | | |
|---|---|---|
| C02F 1/52 | (2006.01) | |
| C02F 101/10 | (2006.01) | |
| C02F 103/00 | (2006.01) | |
| C02F 103/08 | (2006.01) | |
| C02F 103/36 | (2006.01) | |

(52) U.S. Cl.
CPC ........... *C02F 1/5272* (2013.01); *C02F 1/5236* (2013.01); *C02F 2101/101* (2013.01); *C02F 2103/007* (2013.01); *C02F 2103/08* (2013.01); *C02F 2103/36* (2013.01)

(58) Field of Classification Search
CPC ..................................................... C02F 1/5272
See application file for complete search history.

(56) References Cited

U.S. PATENT DOCUMENTS

| | | | |
|---|---|---|---|
| 3,753,900 A | 8/1973 | Moore | |
| 6,663,778 B1 * | 12/2003 | Bader | B01D 61/147 210/640 |
| 7,789,159 B1 * | 9/2010 | Bader | B01D 61/04 166/371 |
| 2013/0334143 A1 * | 12/2013 | Song | C02F 1/5236 210/710 |
| 2015/0376561 A1 * | 12/2015 | Maceda | C12M 21/02 435/292.1 |
| 2016/0279158 A1 * | 9/2016 | Mahe | A61K 31/7008 |

* cited by examiner

*Primary Examiner* — Peter Keyworth

(57) ABSTRACT

The present disclosure is in the field of chemical sciences. The present disclosure relates to a process for removal of anion from aqueous solution. The process involves removal of sulphate ion from aqueous solution using cation and organic solvent that enables precipitation of the sulphate ion from the aqueous solution. The process is simple, efficient, cost-effective, ecofriendly, enables recovery of sulphate ions, calcium ions as calcium sulphate with high purity and also enables the recovery of organic solvent in the range of about 88% to about 99%.

13 Claims, No Drawings

PROCESS FOR REMOVAL OF ANION FROM AQUEOUS SOLUTION

TECHNICAL FIELD

The instant disclosure relates to the field of chemical sciences in general. Particularly, the present disclosure relates to a process for removal of anion from aqueous solution. In an exemplary embodiment, the present disclosure relates to a process for removal of anion such as but not limited to sulphate ions present in aqueous solutions, using cation and solvent.

BACKGROUND

Several studies have been reported for a method to remove sulphate ions from waste water.

A study discloses a process for removing sodium sulphate from waste water generated during the production of polyethyleneimine and cyclohexanone, having more than 20% sodium sulphate. The process is carried out in two steps, wherein in the first step, organic solvents are added to the waste water stream to remove the major sodium sulphate; and in the second step, the sodium sulphate containing water stream is subjected to biological treatment followed by denitrification and nitrification. The entire process is an energy intensive process involving multiple steps including chemical and biological treatments.

Another study discloses a process for removal of sodium sulphate from sulphate containing sodium chloride solution. Here, the sulphate ions are removed in the form of sodium sulphate, and the organic solvent is required in large quantity since sodium sulphate is highly soluble in aqueous phase.

Yet another study discloses partial removal of sulphate ions from waste water obtained from mines in which very high concentration of sulphate ions is present, using calcium hydroxide or lime and calcium. An additional step of evaporation is required to concentrate the sulphate ions before crystallization as sodium or calcium sulphate, in cases where waste water contains lower concentration of sulphate ions. Further, a separate reactor is required for separating out the calcium sulphate. Thus, this is a multi-step non-energy efficient process and is also time consuming and highly complex.

Precipitation by barium chloride is also an efficient method used for removing sulphate ions from the aqueous phase. However, this process also has limitations since barium is not environment friendly and is therefore prevented from use.

Therefore, there is a need to develop better and more efficient, quick, cost-effective and environment friendly processes for removal of sulphate ions from aqueous solutions. The present disclosure addresses such needs.

SUMMARY OF THE DISCLOSURE

The present disclosure relates to a process for removal of anion from aqueous solution.

In an embodiment, the process employs cation and solvent for removal of anion present in the aqueous solution, wherein as an exemplification the solvent is an organic solvent.

In another embodiment of the present disclosure, the anion is removed as a salt from the aqueous solution.

In yet another embodiment of the present disclosure, the anion includes, but is not limited to sulphate ion.

In still another embodiment, the aqueous solution includes, but is not limited to ground water, river water, sea water and aqueous raffinate/phase of hydrothermal liquefaction (HTL) of biomass.

In another exemplary embodiment of the present disclosure, the cation includes, but is not limited to calcium ion, strontium ion and magnesium ion.

In yet another exemplary embodiment of the present disclosure, the organic solvent includes, but is not limited to acetone, ethanol and acetonitrile.

According to a further embodiment, the present disclosure relates to a process for removing anion from a solution, said process comprising:

(i) adding a cation to the solution comprising anion to obtain a mixture containing a salt of the cation and the anion;

(ii) adding a solvent to the mixture to precipitate the salt; and (iii) separating out the precipitated salt from the solution.

DESCRIPTION OF THE DISCLOSURE

To overcome the non-limiting drawbacks as stated in the background and to provide for a simple, efficient and environmental friendly process for removal of anions, the present disclosure provides for process which facilitates removal of anion from aqueous solution.

In an embodiment, the present disclosure relates to removal of anion from a solution.

In an embodiment, the solution is an aqueous solution, including but not limiting to ground water, river water, sea water and aqueous raffinate/phase of hydrothermal liquefaction (HTL) of biomass.

In a preferred embodiment, the present disclosure relates to removal of anion from aqueous raffinate of hydrothermal liquefaction of biomass.

In an embodiment of the present disclosure, removal of anion is carried out in presence of cation and organic solvent.

In an embodiment, the anion includes, but is not limited to sulphate ion.

In another embodiment, the cation includes, but is not limited to calcium ion, strontium ion and magnesium ion. In a preferred embodiment, salts of chlorides of cations such as, but not limited to calcium chloride, strontium chloride and magnesium chloride or any combinations thereof are useful as a source of calcium ion, strontium ion and magnesium ion respectively. In a more preferred embodiment, calcium chloride is useful as a source of calcium.

In yet another embodiment, salt obtained in step (i) of the above process contains the cation and the anion. In an embodiment, the salt obtained in step (i) is selected from a group comprising calcium sulphate, strontium sulphate and magnesium sulphate or any combinations thereof. In another embodiment, the salt obtained in step (i) of the above process is in solubilized form in the mixture.

In still another embodiment, the organic solvent includes, but is not limited to acetone, methanol, ethanol, toluene and acetonitrile. In an embodiment, the organic solvent is involved in precipitation of the salt comprising anion.

In an exemplary embodiment, the removal of anion from aqueous solution is carried out by chemical precipitation method and is a single step process.

The process of the present disclosure for removal of anion from aqueous solution comprises the following acts:

(i) adding cation to aqueous solution containing anion to obtain a mixture containing a salt of the cation and the anion;
(ii) adding organic solvent to the mixture of step (i) to precipitate the salt; and
(iii) separating out the precipitated salt from the aqueous solution.

In an embodiment, the aqueous solution includes, but is not limited to ground water, river water, sea water, biomass, etc. In an exemplary embodiment, the aqueous solution is aqueous raffinate of hydrothermal liquefaction [HTL] of biomass.

In another embodiment, the anion includes but is not limited to sulphate ion.

In an embodiment, the cation includes, but is not limited to calcium ion, strontium ion and magnesium ion. In a preferred embodiment, the cation is calcium salt, including but not limiting to calcium chloride.

In another embodiment, the organic solvent includes, but is not limited to acetone, ethanol and acetonitrile. In a preferred embodiment, the organic solvent is acetone.

In an embodiment, the concentration of anion ranges from about 1 ppm to about 10,000 ppm; the concentration of organic solvent ranges from about 15% to about 35% of aqueous solution; and the concentration of cation ranges from about 1600 ppm to about 6000 ppm.

In another embodiment, the precipitation is carried out at room temperature ranging from about 20° C. to 40° C., for a time period ranging from about 10 minutes to 20 minutes at atmospheric pressure. Said precipitation is performed by stirring the reaction mixture of step (i) for a time period ranging from about 1 minute to 10 minutes with a stirring speed of about 200-350 rotations per minute.

In another embodiment, the organic solvent is recovered and reused.

In an embodiment, the precipitated anion is separated out from the aqueous solution with high purity by filtration, centrifugation and evaporation or any combinations thereof.

In another embodiment, the removal of sulphate ion from the solution ranges from about 50% to 99%.

In yet another embodiment, the above process enables recovery of the solvent in an amount ranging from about 88% to 99%.

In an exemplary embodiment, when calcium chloride as a cation source and acetone as an organic solvent are employed, the precipitated anions (sulphate ions) as $CaSO_4$ are collected by filtration using whatman filter paper 42. The filtrate is transferred into round bottom flask and acetone is recovered using rota vapour. In the rota vapour, the filtrate which contains acetone is rotated under vacuum at 50° C. to recover the acetone from aqueous phase.

In an exemplary embodiment, the process of the present disclosure comprises the following acts:
(i) adding cation such as but not limiting to calcium chloride to aqueous raffinate of hydrothermal liquefaction process to obtain a mixture containing calcium sulphate in the aqueous raffinate;
(ii) adding organic solvent such as but not limiting to acetone to the mixture of step (i) to precipitate the calcium sulphate; and
(iii) separating out the precipitated calcium sulphate by filtration or other conventional techniques.

In an exemplary embodiment, the concentration of sulphate ion in the aqueous raffinate ranges from about 1 ppm to about 10,000 ppm; the concentration of chloride ion in the aqueous raffinate ranges from about 0 ppm to about 12000 ppm; the concentration of calcium ion ranges from about 1600 ppm to about 6000 ppm; and the concentration of organic solvent ranges from about 15% to about 35% of the aqueous solution.

In an embodiment, the process of removal of sulphate ion from aqueous raffinate of hydrothermal liquefaction process is to prevent deactivation of catalyst used subsequently for catalytic hydrothermal gasification (CHG) of aqueous phase in the next step. At high temperature conditions, high concentration of sulphate ions present in the aqueous phase of HTL of biomass give rise to thermal sintering and salt precipitation over catalyst. This results in decreasing active surface area and subsequently poisoning of the catalyst, in turn resulting in catalyst deactivation Therefore, by reducing the level of sulphate ions in the aqueous phase, salt formation over catalyst is reduced/prevented and the catalyst lifespan of CHG process is improved.

In an embodiment, the instant process enables removal of sulphate ion from aqueous solution in an amount ranging from about 50% to 99%.

In another embodiment, the instant process enables removal of sulphate ion from aqueous solution containing low amounts of sulphate ion (<1%).

In another embodiment, the instant process enables recovery of the organic solvent in an amount ranging from about 88% to 98%.

In an exemplary embodiment, the present disclosure provides a process for removing sulphate ion from aqueous solution comprising the following acts:
(i) adding calcium chloride to the aqueous solution of sulphate ions to obtain calcium sulphate; wherein concentration of sulphate ion in the aqueous solution ranges from about 1 ppm to about 10,000 ppm, the concentration of chloride ion in the aqueous solution ranges from about 0 ppm to about 12000 ppm and the concentration of calcium ion ranges from about 1600 ppm to about 6000 ppm;
(ii) adding organic solvent such as but not limiting to acetone at concentration ranging from about 15% to about 35% of the aqueous raffinate to the mixture of step (i) to precipitate the calcium sulphate; and
(iii) separating out the precipitated calcium sulphate (high purity) by filtration, centrifugation, evaporation or other conventional techniques.

In another exemplary embodiment, the present disclosure provides a process for removing sulphate ion from aqueous raffinate of hydrothermal liquefaction process, comprising the following acts:
(i) adding calcium chloride to the aqueous raffinate of hydrothermal liquefaction process comprising about 1% sulphate ion and about 1.2% chloride ion concentration to obtain calcium sulphate in the aqueous raffinate of hydrothermal liquefaction process; wherein concentration of sulphate ion in the aqueous raffinate ranges from about 1 ppm to about 10,000 ppm, the concentration of chloride ion in the aqueous raffinate ranges from about 0 ppm to about 12000 ppm and the concentration of calcium ion ranges from about 1600 ppm to about 6000 ppm;
(ii) adding organic solvent such as but not limiting to acetone at concentration ranging from about 15% to about 35% of the aqueous raffinate to the mixture of step (i) to precipitate the calcium sulphate; and
(iii) separating out the precipitated calcium sulphate by filtration or other conventional techniques.

In another embodiment, the instant process enables recovery of the organic solvent in an amount ranging from about 88% to 98%.

Additional embodiments and features of the present disclosure will be apparent to one of ordinary skill in art based upon description provided herein. The embodiments herein provide various features and advantageous details thereof in the description. Descriptions of well-known/conventional methods and techniques are omitted so as to not unnecessarily obscure the embodiments herein. Further, the disclosure herein provides for examples illustrating the above described embodiments, and in order to illustrate the embodiments of the present disclosure certain aspects have been employed. The examples used herein for such illustration are intended merely to facilitate an understanding of ways in which the embodiments herein may be practiced and to further enable those of skill in the art to practice the embodiments herein. Accordingly, the following examples should not be construed as limiting the scope of the embodiments herein.

EXAMPLES

Example 1

General Procedure for Removal of Anions from a Solution

An aqueous solution containing anion is charged with cation(s) and is mixed thoroughly. No precipitation or turbidity is observed. On adding organic solvent to the mixture, precipitation of sulphate ions along with cation is observed in the form of salts. The precipitated salt is separated from the aqueous solution by a suitable separation process such as filtration or other conventional techniques.

Example 2

Removing Sulphate Ions from Aqueous Solution

About 10 ml (each) solution containing about 1 ppm to 10,000 ppm sulphate ion concentration is charged with concentration of the calcium ranging from about 1600 ppm to 6000 ppm and is subjected to mixing at a temperature ranging from about 20° C. to 40° C., for a time period ranging from about 20 minutes to 4 hours at atmospheric pressure. No precipitation or turbidity is observed. Upon adding an organic solvent such as, acetone, ethanol, acetonitrile or their combinations in a quantity ranging from about 7.5 ml to 20 ml to the mixture, precipitation of sulphate ions as $CaSO_4$ is observed within about 10 minutes.

Example 3

Study with Respect to Variation in Stirring Time

All experiments (Sr. No. 1-4) of the below Table 1 are carried out by varying stirring time in order to demonstrate the ability of the process to work at different stirring timings and also to identify the efficient stirring duration.

TABLE 1

Study with respect to variation in stirring time

| Sr. No. | NaCl Sol. (8000 ppm Cl) ml | $CaCl_2$ (4800 ppm) Ml | Acetone ml | Sample ($SO_4$ Soln.) ml | Result % $SO_4$ removal |
|---|---|---|---|---|---|
| 1 | 10 | 10 | 20 (1 minute stirring) | 10 (1000 ppm) | 97.27 |
| 2 | 10 | 10 | 20 (2 minutes stirring) | 10 (1000 ppm) | 98.42 |
| 3 | 10 | 10 | 20 (5 minutes stirring) | 10 (1000 ppm) | 98.71 |
| 4 | 10 | 10 | 20 (10 minutes stirring) | 10 (1000 ppm) | 99.25 |

The above reaction time study demonstrates that the stirring time (1 minute to 10 minutes) is directly proportional to the % $SO_4$ removal from solution containing sulphate anions. Hence, this study clearly shows the effect of time period for efficient removal of sulphate anions.

Example 4

Study Showcasing the Effect of Change in Sequence of Adding Various Chemicals

Experiments (Sr. No. 1-2) of the below Table 2 are carried out by varying the sequence of chemical addition by carrying out stirring for 10 minutes.

TABLE 2

Study showcasing the effect of change in sequence of adding various chemicals

| Sr. No. | NaCl Sol. (8000 ppm Cl) ml | $CaCl_2$ (4800 ppm) Ml | Acetone ml | Sample ($SO_4$ Soln.) Ml | Result % $SO_4$ removal |
|---|---|---|---|---|---|
| 1 | 10 | 10 | 20 (before Ca Soln.) | 10 (1000 ppm) | 98.96 |
| 2 | 10 | 10 | 20 (after Ca Soln.) | 10 (1000 ppm) | 99.25 |

Results tabulated in Table 2 demonstrates that the addition of calcium ion solution (cation) followed by the addition of acetone (solvent) to the sulphate ion containing solution show improved/better sulphate removal over the addition of acetone followed by the calcium ions. Thus, this study clearly establishes the importance of sequence steps i.e. addition of cation followed by the addition of solvent as the preferred sequence for carrying out the process.

Example 5

Study with Respect to Variation in Experiment Temperature

All experiments (Sr. No. 1-3) of the below Table 3 are carried out by varying temperature in order to demonstrate the ability of the process in removing sulphate ions efficiently from a solution containing sulphate ions. Stirring time is maintained 10 minutes for the below experiments.

TABLE 3

Study with respect to variation in experiment temperature

| Sr. No. | NaCl Sol. (8000 ppm Cl) ml | CaCl$_2$ (4800 ppm) ml | Acetone ml | Sample (SO$_4$ Soln.) ml | Result % SO$_4$ removal |
|---|---|---|---|---|---|
| 1 | 10 | 10 | 20 (Room Temperature) | 10 (1000 ppm) | 99.25 |
| 2 | 10 | 10 | 20 (stirring at 20° C.) | 10 (1000 ppm) | 98.88 |
| 3 | 10 | 10 | 20 (stirring at 40° C.) | 10 (1000 ppm) | 97.67 |

The above temperature study establishes that the % SO$_4$ removal from the solution containing sulphate works efficiently at room temperature, preferably between about 20° C. to 40° C.

Example 6

Study with Respect to Variation in Cation Concentration

All experiments (Sr. No. 1-4) of the below Table 4 are carried out by varying calcium concentration (cation) in order to demonstrate the ability of the process to remove sulphate ions from a solution containing sulphate ions. Stirring time is maintained as 10 minutes for the below experiments.

TABLE 4

Study with respect to variation in cation concentration

| Sr. No. | NaCl Sol. (8000 ppm Cl) ml | CaCl$_2$ (4800 ppm) ml | Acetone ml | Sample (SO$_4$ Soln.) ml | Result % SO$_4$ removal |
|---|---|---|---|---|---|
| 1 | 10 | 10 (1600 ppm) | 20 | 10 (1000 ppm) | 88.00 |
| 2 | 10 | 10 (3200 ppm) | 20 | 10 (1000 ppm) | 98.47 |
| 3 | 10 | 10 (4000 ppm) | 20 | 10 (1000 ppm) | 98.62 |
| 4 | 10 | 10 (5000 ppm) | 20 | 10 (1000 ppm) | 99.22 |
| 5 | 10 | 10 (6000 ppm) | 20 | 10 (1000 ppm) | 99.12 |

The above study on effect of concentration of calcium demonstrates that the concentration range of 1600 ppm to 6000 ppm is suitable for carrying out the reaction process efficiently.

Example 7

Study with Respect to Variation in Anion Concentration

All experiments (Sr. No. 1-8) of the below Table 5 are carried out by varying sulphate (anion) concentration in order to demonstrate the ability of the process to remove sulphate ions at different concentrations in a solution. Stirring time is maintained as 10 minutes for the below experiments.

TABLE 5

Study with respect to variation in anion concentration

| Sr. No. | NaCl Sol. (8000 ppm Cl) ml | CaCl$_2$ (4800 ppm) ml | Acetone ml | Sample (SO$_4$ Soln.) ml | Result % SO$_4$ removal |
|---|---|---|---|---|---|
| 1 | 10 | 10 | 20 | 10 (5 ppm) | 98.40 |
| 2 | 10 | 10 | 20 | 10 (50 ppm) | 91.58 |
| 3 | 10 | 10 | 20 | 10 (100 ppm) | 90.16 |
| 4 | 10 | 10 | 20 | 10 (500 ppm) | 98.48 |
| 5 | 10 | 10 | 20 | 10 (1000 ppm) | 99.25 |
| 6 | 10 | 10 | 20 | 10 (2000 ppm) | 99.41 |
| 7 | 10 | 10 | 20 | 10 (7000 ppm) | 99.76 |
| 8 | 10 | 10 | 20 | 10 (10000 ppm) | 99.35 |

Results tabulated in the Table 5 depicts that the sulphate concentration ranging from 5 ppm to 10,000 ppm could be removed efficiently from a solution using cation and solvent.

Example 8

Study with Respect to Variation in Solvent

All experiments (Sr. No. 1-6) of the below Table 6 are carried out by varying solvents in order to demonstrate the ability of the process in removal of sulphate ions from a solution. Stirring time is maintained as 10 minutes for the below experiments.

TABLE 6

Study with respect to variation in solvent

| Sr. No. | NaCl Sol. (8000 ppm Cl) ml | CaCl$_2$ (4800 ppm) ml | Acetone ml | Sample (SO$_4$ Soln.) ml | Result % SO$_4$ removal |
|---|---|---|---|---|---|
| 1 | 10 | 10 | 20 (Acetone) | 10 (500 ppm) | 98.48 |
| 2 | 10 | 10 | 20 (Ethanol) | 10 (500 ppm) | 97.89 |
| 3 | 10 | 10 | 20 (Acetonitrile) | 10 (500 ppm) | 97.33 |
| 4 | 10 | 10 | 20 (Acetone) | 10 (1000 ppm) | 99.25 |
| 5 | 10 | 10 | 20 (Ethanol) | 10 (1000 ppm) | 96.67 |
| 6 | 10 | 10 | 20 (Acetonitrile) | 10 (1000 ppm) | 97.35 |

Results tabulated in the Table 6 depicts that the process of removal of sulphate ion works efficiently in all organic solvents including acetone, ethanol and acetonitrile.

Example 9

Study with Respect to Variation in Solvent Concentration

All experiments (Sr. No. 1-4) of the below Table 7 are carried out by varying solvent (acetone) quantity in order to demonstrate the ability of the present process for removal of sulphate ions from a solution containing sulphate ions. Stirring time is maintained as 10 minutes for the below experiments.

TABLE 7

Study with respect to variation in solvent concentration

| Sr. No. | NaCl Sol. (8000 ppm Cl) ml | CaCl$_2$ (4800 ppm) ml | Acetone ml | Sample (SO$_4$ Soln.) ml | Result % SO$_4$ removal |
|---|---|---|---|---|---|
| 1 | 10 | 10 | 20 (40%) | 10 (1000 ppm) | 99.25 |
| 2 | 10 | 10 | 17.5 (35%) | 10 (1000 ppm) | 98.70 |
| 3 | 10 | 10 | 12.5 (25%) | 10 (1000 ppm) | 95.93 |
| 4 | 10 | 10 | 7.5 (15%) | 10 (1000 ppm) | 90.72 |

Results tabulated in the Table 7 depicts that the process of removal of sulphate ion using cation is efficient and workable at different quantities of organic solvents.

Example 10

About 10 ml (each) solution of about 800 ppm sulphate ion concentration, about 1600 ppm calcium concentration and about 8000 ppm chloride concentration are mixed in a beaker at room temperature (about 30° C.) and about 200-350 rpm stirring speed. No precipitation or turbidity is observed. On adding about 10 ml acetone to the mixture, precipitation of sulphate ions as CaSO$_4$ is observed and sulphate is recovered in an amount ranging from about 80% to about 88% within 10 minutes.

Example 11

About 10 ml (each) solution of about 800 ppm sulphate ion concentration, about 1600 ppm calcium concentration and about 8000 ppm chloride concentration are mixed in a beaker at room temperature (about 30° C.) and about 200-350 rpm stirring speed. No precipitation or turbidity is observed. On adding about 10 ml acetonitrile solvent to the mixture, turbidity is observed and sulphate is recovered in an amount ranging from about 82% to about 84%.

Example 12

About 10 ml (each) solution of about 800 ppm sulphate ion concentration, about 1600 ppm calcium concentration and about 8000 ppm chloride concentration are mixed in a beaker at room temperature (about 30° C.) and about 200-350 rpm stirring speed. No precipitation or turbidity is observed. On adding about 10ml ethanol solvent to the mixture, turbidity is observed and sulphate is recovered in an amount ranging from about 64% to about 69%.

Example 13

In example 13, other solvents (about 10 ml) such as methanol, tetrahydrofuran, toluene, dimethyl formamide are used in place of ethanol solvent to precipitate sulphate ions but no turbidity or precipitation is observed on the addition of these solvents.

Example 14

About 10 ml aqueous phase obtained from HTL of algae having about 187 ppm sulphate ion concentration is mixed with about 10 ml solution of about 4800 ppm calcium concentration and about 8000 ppm chloride solution at room temperature (about 30° C.) and about 200-350 rpm stirring speed. On adding about 20 ml acetone to the above mentioned solution, sulphate ions are precipitated as CaSO$_4$ with about 98% removal of sulphate ions within about 10 minutes.

Example 15

About 10 ml aqueous phase obtained from HTL of algae having about 800 ppm sulphate ion concentration is mixed with about 10 ml solution of about 4800 ppm calcium concentration and about 8000 ppm chloride solution at room temperature (about 30° C.) and about 200-350 rpm stirring speed. On adding about 20 ml acetone to the above mentioned solution, sulphate ions are precipitated as CaSO$_4$ with about 82% removal of sulphate ions within about 10 minutes.

Example 16

About 5 ml aqueous phase obtained from HTL of algae having about 5100 ppm sulphate ion concentration is mixed with about 20 ml solution of about 4800 ppm calcium concentration in the absence of about 8000 ppm chloride solution at room temperature (about 30° C.) and about 200-350 rpm stirring speed. On adding about 20 ml acetone to the above mentioned solution, sulphate ions are precipitated as CaSO$_4$ with about 97% removal of sulphate ions within about 10 minutes.

Example 17

About 0.2664 g calcium chloride is added to about 5 ml aqueous phase obtained from HTL of algae having about 5100 ppm sulphate ion concentration in the absence of about 8000 ppm chloride solution at room temperature (about 30° C.) and about 200-350 rpm stirring speed. On adding about 20 ml acetone to the above mentioned solution, sulphate ions are precipitated as CaSO$_4$ with about 98% removal of sulphate ions within about 10 minutes.

Example 18

About 0.2664 g calcium chloride is added to about 5 ml aqueous phase obtained from HTL of algae having about 5100 ppm sulphate ion concentration in the absence of about 8000 ppm chloride solution at room temperature (about 30° C.) and about 200-350 rpm stirring speed. On adding about 5 ml acetone to the above mentioned solution, sulphate ions are precipitated as CaSO$_4$ with about 98% removal of sulphate ions within about 10 minutes.

Example 19

About 10 ml sea water having about 344 ppm sulphate ion concentration is mixed with about 10 ml solution of about 4800 ppm calcium concentration and about 8000 ppm chloride solution at room temperature (about 30° C.) and about 200-350 rpm stirring speed. On adding about 20 ml acetone to the above mentioned solution, sulphate ions are precipitated as CaSO$_4$ with about 98% removal of sulphate ions within about 10 minutes.

Example 20

About 10 ml sea water having about 800 ppm sulphate ion concentration is mixed with about 10 ml solution of about 4800 ppm calcium concentration and about 8000 ppm chloride solution at room temperature (about 30° C.) and about 200-350 rpm stirring speed. On adding about 20 ml acetone to the above mentioned solution, sulphate ions are precipitated as $CaSO_4$ with about 94% removal of sulphate ions within about 10 minutes.

ADVANTAGES

The present disclosure enables the removal of sulphate ions from solutions, particularly aqueous solution including but not restricting to aqueous raffinate of hydrothermal of biomass. When high concentration of sulphate ions is present in the aqueous phase of HTL of biomass, they get absorbed on the catalyst surface resulting in catalyst deactivation subsequently used for catalytic hydrothermal gasification (CHG) of aqueous phase in the next step. Therefore, by removing sulphate ions from the aqueous phase, the process of the present disclosure improves the catalyst lifespan of CHG process.

The present disclosure enables recovery of sulphate ions and calcium as calcium sulphate with high purity.

The present disclosure enables recovery of the organic solvent in the range of about 88% to about 99%. The recovered organic solvent may then be used in the same process, which makes it cost effective.

The process of the present disclosure is a single step process, efficient and environment friendly.

Thus, the present disclosure is able to successfully overcome the various deficiencies of prior art and provide for an improved process for removal of sulphate ions from aqueous solutions.

Additional embodiments and features of the present disclosure will be apparent to one of ordinary skill in art based on the description provided herein. The embodiments herein provide various features and advantageous details thereof in the description. Descriptions of well-known/conventional methods and techniques are omitted so as to not unnecessarily obscure the embodiments herein.

The foregoing description of the specific embodiments fully reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments in this disclosure have been described in terms of preferred embodiments, those skilled in the art will recognize that the embodiments herein can be practiced with modification within the spirit and scope of the embodiments as described herein.

Throughout this specification, the word "comprise", or variations such as "comprises" or "comprising" wherever used, will be understood to imply the inclusion of a stated element, integer or step, or group of elements, integers or steps, but not the exclusion of any other element, integer or step, or group of elements, integers or steps.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles and the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the particular features of this disclosure, it will be appreciated that various modifications can be made, and that many changes can be made in the preferred embodiments without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

We claim:
1. A process for removing anion from a solution, said process comprising:
 (i) adding a cation to the solution comprising anion to obtain a mixture containing a salt of the cation and the anion;
 (ii) adding an organic solvent to the mixture at an atmospheric pressure to precipitate the salt, wherein the organic solvent is selected from a group comprising acetone, ethanol, acetonitrile, and any combinations thereof; and
 (iii) separating out the precipitated salt from the solution.

2. The process as claimed in claim 1, wherein the solution is an aqueous solution selected from a group comprising ground water, river water, sea water, aqueous raffinate phase of hydrothermal liquefaction (HTL) of biomass and combinations thereof.

3. The process as claimed in claim 1, wherein the anion is sulphate ion.

4. The process as claimed in claim 1, wherein the cation is selected from a group comprising calcium ion, strontium ion, magnesium ion and combinations thereof.

5. The process as claimed in claim 1, wherein concentration of the anion in the solution ranges from about 5 ppm to 10,000 ppm; concentration of the organic solvent ranges from about 15% to 40% of aqueous solution; and concentration of the cation ranges from about 1600 ppm to about 6000 ppm.

6. The process as claimed in claim 1, wherein said process is carried out at a temperature ranging from about 20° C. to 40° C. for a time period ranging from about 10 minutes to 20 minutes at an atmospheric pressure.

7. The process as claimed in claim 1, wherein the addition of organic solvent in step (ii) comprises adding the organic solvent and stirring for a time period ranging from 1 minute to 10 minutes with a stirring speed of about 200-350 rotations per minute to precipitate the anion.

8. The process as claimed in claim 1, wherein the precipitated salt comprising anion in step (iii) is separated out from the solution by filtration, centrifugation and evaporation or any combinations thereof.

9. The process as claimed in claim 1, wherein the removal of anion from the solution ranges from about 50% to 99%.

10. The process as claimed in claim 1, wherein said process enables recovery of the organic solvent in an amount ranging from about 88% to 99%.

11. The process as claimed in claim 1, wherein the anion is sulphate anion, and wherein the process of removal of sulphate ion comprises steps of:
(i) adding calcium chloride to aqueous raffinate of hydrothermal liquefaction process to obtain a mixture containing calcium sulphate in the aqueous raffinate;
(ii) adding acetone to the mixture of step (i) to precipitate the calcium sulphate; and
(iii) separating out the precipitated calcium sulphate.

12. The process as claimed in claim 1, wherein the anion is sulphate anion, and wherein the process of removal of sulphate ion comprises steps of:
(i) adding calcium chloride to aqueous raffinate of hydrothermal liquefaction process to obtain calcium sulphate; wherein concentration of sulphate ion in the aqueous solution ranges from about 1 ppm to about 10,000 ppm, the concentration of chloride ion in the aqueous solution ranges from about 0 ppm to about 12000 ppm and the concentration of calcium ion ranges from about 1600 ppm to about 6000 ppm;
(ii) adding acetone at concentration ranging from about 15% to about 35% of the aqueous raffinate to the mixture of step (i) to precipitate the calcium sulphate; and
(iii) separating out the precipitated calcium sulphate.

13. The process as claimed in claim 1, wherein the anion is sulphate anion, and wherein the process of removal of sulphate ion comprises steps of:
(i) adding calcium chloride to aqueous raffinate of hydrothermal liquefaction process comprising about 1% sulphate ion and about 1.2% chloride ion concentration to obtain calcium sulphate in the aqueous raffinate of hydrothermal liquefaction process; wherein concentration of sulphate ion in the aqueous raffinate ranges from about 1 ppm to about 10,000 ppm, the concentration of chloride ion in the aqueous raffinate ranges from about 0 ppm to about 12000 ppm, and the concentration of calcium ion ranges from about 1600 ppm to about 6000 ppm;
(ii) adding acetone at concentration ranging from about 15% to about 35% of the aqueous raffinate to the mixture of step (i) to precipitate the calcium sulphate; and
(iii) separating out the precipitated calcium sulphate.

\* \* \* \* \*

UNITED STATES PATENT AND TRADEMARK OFFICE
CERTIFICATE OF CORRECTION

PATENT NO. : 10,875,795 B2
APPLICATION NO. : 15/401954
DATED : December 29, 2020
INVENTOR(S) : Chintansinh Dharmendrasinh Chudasama et al.

It is certified that error appears in the above-identified patent and that said Letters Patent is hereby corrected as shown below:

On the Title Page

(30) Foreign Application Priority Data "Nov. 1, 2016" should read -- January 11, 2016 --.

Signed and Sealed this
Eleventh Day of April, 2023

Katherine Kelly Vidal
*Director of the United States Patent and Trademark Office*